April 12, 1966   F. C. CHOICE ETAL   3,245,100
ASSEMBLING AND BACKPART MOLDING MACHINES
Filed Oct. 7, 1963   6 Sheets-Sheet 1

Inventors
Frank C. Choice
John W. Pratt
By their Attorney

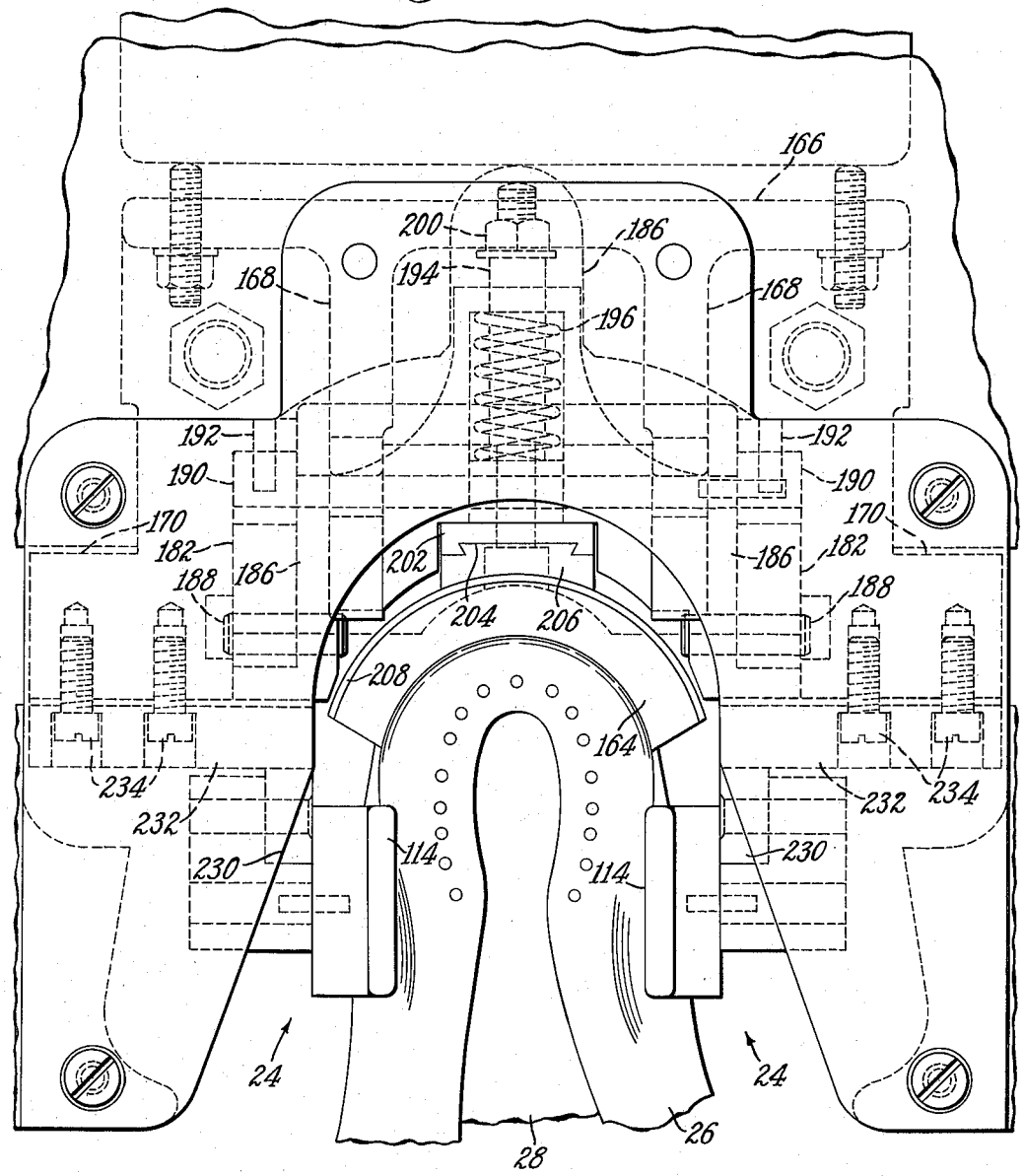

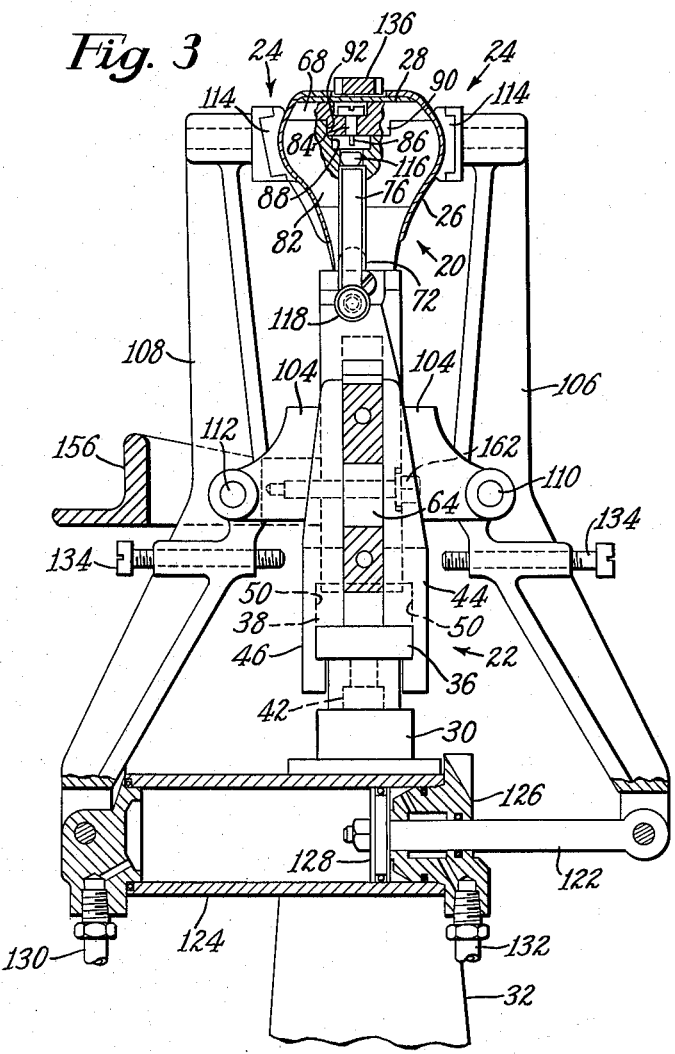
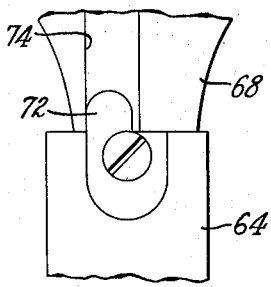

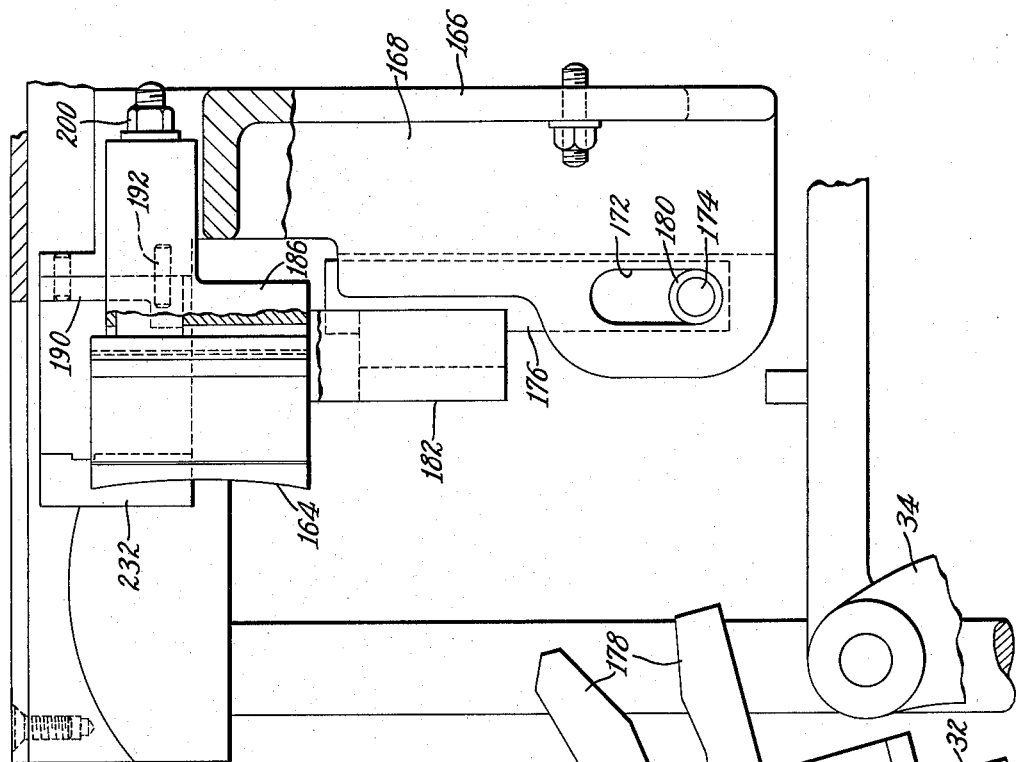
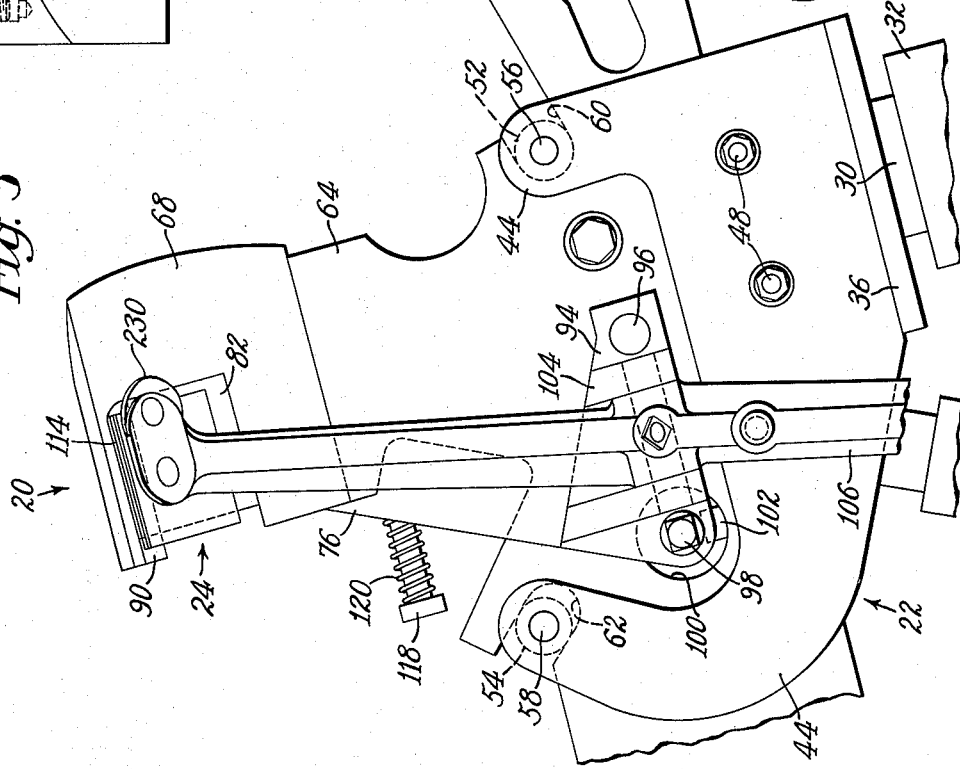
Fig. 5

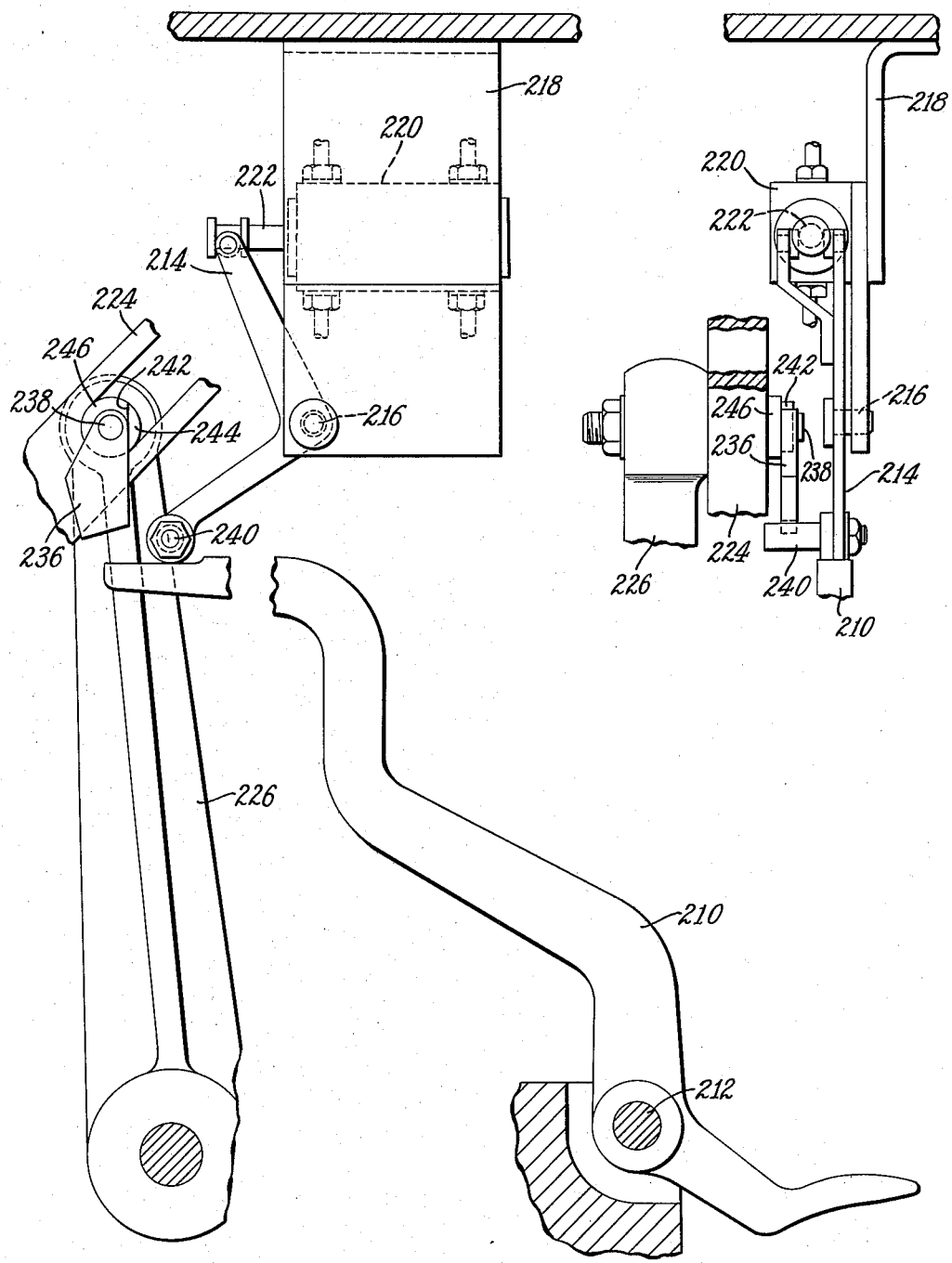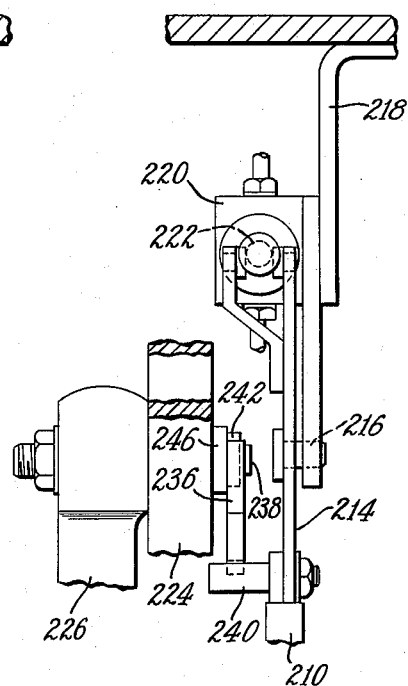

United States Patent Office 3,245,100
Patented Apr. 12, 1966

3,245,100
ASSEMBLING AND BACKPART MOLDING MACHINES
Frank C. Choice and John W. Pratt, Leicester, England, assignors to United Shoe Machinery Corporation, Flemington, N.J., a corporation of New Jersey
Filed Oct. 7, 1963, Ser. No. 314,411
Claims priority, application Great Britain, Oct. 16, 1962, 39,038/62
18 Claims. (Cl. 12—54.3)

This invention relates to shoe machines and is herein illustrated in its application to machines for assembling shoe upper parts, molding the back part of a shoe upper upon a heel form, and lasting the heel end portion of the upper to an insole supported upon the form.

The patent to Carr, No. 2,983,935, discloses a machine for forming or molding heel end portions of shoe uppers, particularly uppers in which the bottom margins are flanged outwardly for attachment to a sole. The heel form disclosed in the Carr patent is a composite structure comprising a rear portion and a forward portion to which a shoe upper is secured by grippers while the rear portion moves relatively to the forward portion thereby to tension the heel end portion of the upper.

It is an object of the present invention to provide a backpart molding machine having a composite heel form of the type disclosed in the Carr patent constructed to adapt it to the requirements of a machine in which a shoe upper, after being shaped or molded to the heel form, is lasted inwardly over an insole mounted on the form. Such a form must adequately support the heel portion of an insole during the heel end lasting operation. Accordingly, it is another object of the present invention to provide for the heel end molding operation, a two-part heel form of the type disclosed in the Carr patent above referred to which is constructed to provide an uninterrupted surface for supporting the heel portion of an insole during a heel end lasting operation. With the above objects in view the present invention in one aspect thereof contemplates the provision in a shoe machine of a form which mounts an end portion of a shoe upper and moves to present the upper to operating instrumentalities of the machine and is characterized by a member or a plug mounted within the form, providing a part of its upper shaping structure, and movable relatively to the form endwise of a shoe upper mounted thereon, suitable means being provided for gripping the upper against said plug. In order to provide an uninterrupted surface for supporting an insole during an end lasting operation the plug is mounted within a recess extending lengthwise of the form between its base portion and its insole supporting surface. In order to cause the gripping means to move with the shoe form as it advances to present the upper to operating instrumentalities of the machine the illustrated gripping means is carried by means, herein illustrated as a jack, on which the form is mounted.

In the illustrated organization the plug mounted in the shoe form serves as one element of the upper gripping means and accordingly the plug must maintain its registration with the grippers during the upper tensioning operation. In the illustrated organization this is achieved by providing suitable connections between the plug and the carrier on which the gripping means is mounted.

In accordance with a further feature of the invention the illustrated gripper members carry their own operating means which moves with the grippers as they advance with the form during movement of the form to present an upper thereon to operating instrumentalities of the machine. In the illustrated organization the grippers are mounted in a pair of levers fulcrumed on the gripper carrier and the levers are arranged to mount the gripper operating means, herein illustrated as a piston and cylinder assembly.

In the illustrated organization an upper embracing member or band engages an end portion of a shoe upper on the form and advances with the form as it moves to present the upper to operating instrumentalities of the machine. In order to maintain the registration of the upper embracing means with the form during such movement of the form suitable connections are provided between the carrier on which the form is mounted and a carrier for the upper embracing means thereby to insure movement of said carriers in unison after the upper embracing means has been brought into upper embracing position.

Novel means is provided for removably mounting the form on its supporting means comprising a pin extending upwardly from the supporting means and receivable within a suitable opening in the form, a member or key carried by the supporting means and arranged to determine the orientation of the form thereon and retaining means in the form of a hook carried by the supporting means and arranged to hold the form against separation therefrom. In accordance with a further feature of the invention the illustrated retaining means serves also as the carrier for the upper engaging gripping means.

To provide for the retention of an insole on the form on which the upper is mounted a suitable holddown member is mounted on the jack. In the illustrated construction the holddown member is provided with means herein illustrated as spurs for engaging the insole and maintaining its registration on the form.

These and other features of the invention will now be described with reference to the accompanying drawings and pointed out in the appended claims.

In the drawings:

FIG. 2 is a plan view of the head of the machine, the lasting wipers and associated parts being omitted;

FIG. 3 is a front elevation partly in section illustrating work supporting and clamping mechanism of the machine;

FIG. 4 is an enlarged detail view in front elevation illustrating parts of the work supporting mechanism shown in FIG. 3;

FIG. 5 is a right side elevation illustrating particularly the shoe supporting jack mechanism;

FIG. 8 is a left side elevation with certain parts shown in section and other parts broken away illustrating certain operating mechanisms of the machine; and FIG. 9 is a front elevation illustrating certain parts shown in FIG. 8.

Figure 1:
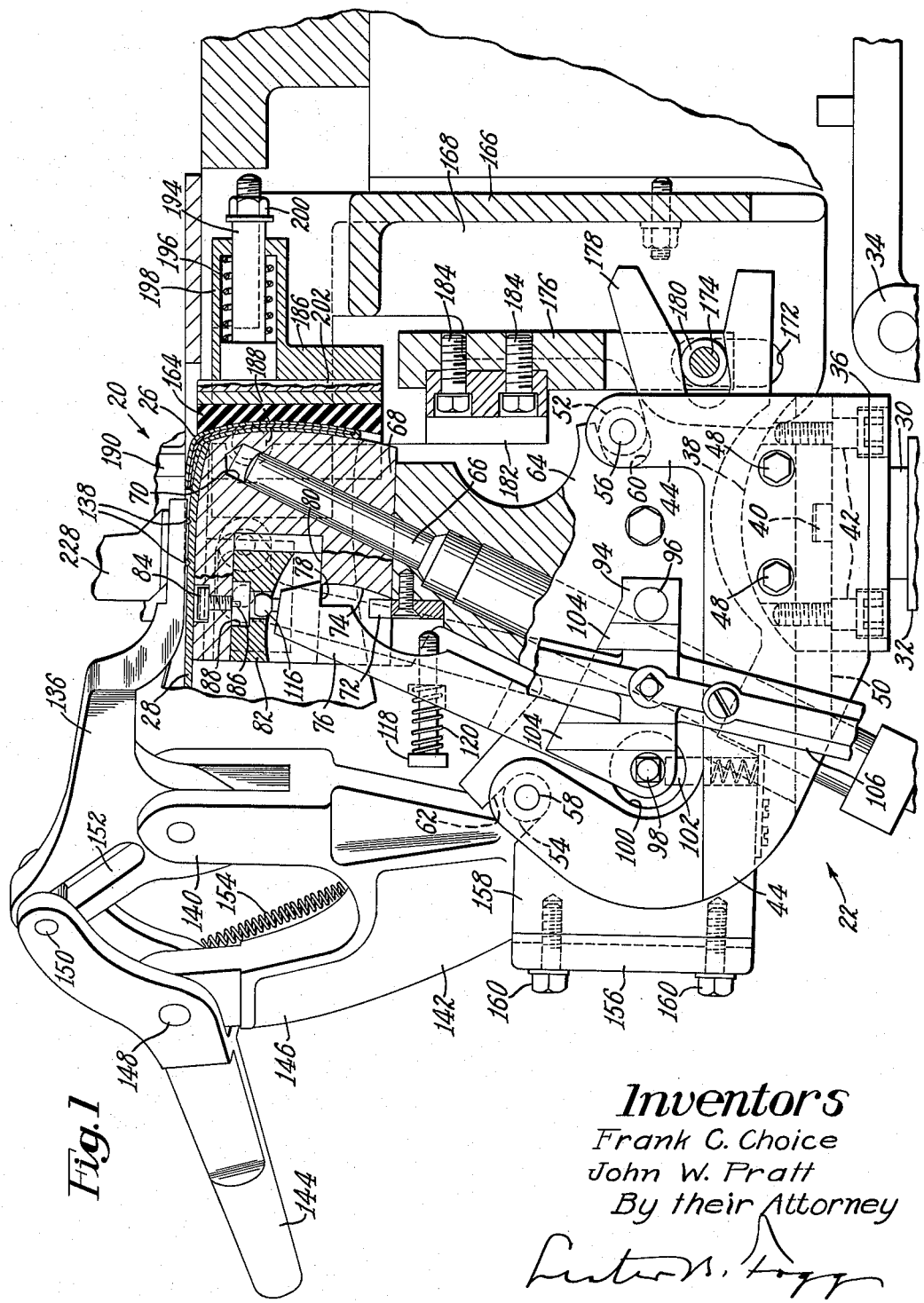
FIG. 1 is a right side elevation of the head of a machine embodying the features of the present invention with certain parts broken away and other parts shown in section.

The invention is illustrated in the drawings as embodied in a machine for shaping heel end portions of shoe uppers, wiping their lasting margins inwardly over an insole and attaching the overlasted margins to the insole. The illustrated machine is provided with a two part supporting means 20 which is expansible in the direction of the length of a shoe upper mounted thereon. The two part support is carried by a jack 22 and a pair of grippers 24 (FIG. 2) is provided for holding the upper firmly against the forward portion of the support.

For lasting the heel end portion of a shoe upper 26 (FIG. 3) inwardly over an insole 28 and securing the overlasted margins to the insole the illustrated machine is provided with wiping and tacking means (not shown) generally similar to the wiping and tacking means disclosed, for example, in United States Letters Patent No. 1,949,539, granted March 6, 1934 on an application filed in the names of Gouldbourn et al.

The illustrated jack mechanism in its general organization, is of known construction. Briefly described, the jack member 22 is carried by a post 30 slidably mounted in a sleeve 32 formed integrally with a yoke 34. In the operation of the machine mechanism connected to the yoke 34 causes the jack assembly to swing inwardly to bring the post 30 into a substantially vertical position whereupon the post is moved upwardly to bring a shoe upper on the support 20 into the operating station of the machine.

The illustrated jack post 30 is formed with a generally T-shaped head portion 36 on which a block 38 having an arcuate upper surface is positioned by means of a key 40, the block 38 being secured to the T-head 36 by screws 42. A pair of bent arms 44 and 46 is secured to the block 38 by bolts 48, the position of the arms on the T-head being determined by mating engagement between grooves 50 formed in the horizontal base portions of the arms 44 and 46 respectively with complementally shaped portions of the T-head 36 and the block 38 (FIG. 3). Two rolls 52 and 54 (FIG. 1) are positioned between forward and rearward portions respectively of the arms 44 and 46 and mounted on suitable cross-pins 56 and 58 fixed in the arms 44 and 46. The rolls 52 and 54 are positioned within open-ended slots 60 and 62 formed in a carrier or block 64 and arranged to permit limited rocking movement of the block upon the rolls. The block 64 has a plane upper surface on which the work supporting means is removably mounted.

The work supporting means comprises a heel form 68 and a member or plug 82. The heel form is generally similar in shape to the heel end portion of a last but differs from the shape of the last in that its lower or base portion is somewhat narrower than the corresponding portion of a last. The heel form 68 is registered on the upper face of the block 64 by a heating element 66, which as shown in FIG. 1, is received within a socket 70 in the form 68. The orientation of the form 68 on the block 64 is determined by a key 72 (FIG. 4) which is received within an open-ended slot 74 in the forward portion of the form 68. The narrow base portion of the heel form is offset widthwise of the form relatively to its upper or heel seat face, the offset being in one direction for left shoes and in the opposite direction for right shoes. In order to accommodate the offset structure of the base of the form the slot 74 is offset from the widthwise center of the base of the form as shown in FIGS. 3 and 4 and the key 72 is made reversible for operation on both right and left foot heel forms.

For securing the heel form against upward movement away from the block 64 an arm 76 is mounted on the block for swinging movement toward and from the forward portion of the heel form, said arm having incorporated in its upper end portion a hook 78. During its rearward swinging movement the arm 76 moves into the slot 74 and brings the hook 78 into engagement with a ledge 80 in the heel form.

The plug 82 constituting the forward portion of the work supporting assembly is mounted for sliding movement lengthwise of an upper in the machine relatively to the heel form 68. Referring to FIG. 1 a forward portion of the heel form 68 carries a headed screw 84 having incorporated therein a depending pin 86 which is received within a relatively large bore 88 formed in the plug 82, thus restricting the relative movement of the two parts of the work supporting assembly when the assembly is in storage. The plug 82 is restricted to rectilinear movement lengthwise of the upper by a tongue 90 (FIG. 3) formed in the forward portions of the heel form 68 and acting in a groove 92 formed in the plug. The arm 76 is formed with a bifurcated lower portion which straddles the block 64 and is received between parallel plates 94 pivotally mounted respectively on opposite end portions of a cross-pin 96 mounted in the block 64. The bifurcated lower portion of the arm 76 is pivotally mounted on a cross-pin 98 which extends through a clearance bore 100 formed in the block 64 and is received in bearings provided by bores in the parallel plates 94. The cross-pin 98 together with the parallel plates 94 are urged upwardly by a spring-pressed plunger 102 mounted in a suitable socket formed in the block 64.

Referring to FIG. 3 the bifurcated lower portion of the arm 76 carries at each side thereof two parallel arms 104 between which are received two gripper levers 106 and 108, the former being pivotally mounted on a cross-pin 110 and the latter on a cross-pin 112. Each gripper lever carries at its upper end portion a pad 114 constructed and arranged to grip the upper 26 against the plug 82. In order to insure movement of the plug lengthwise of the shoe upper 26 concomitantly with corresponding movement of the pads 114 the plug is bored to receive a ball-headed pin 116 carried by the upper end portion of the arm 76 (FIG. 1). The pin 116 is so located that each pad 114 registers exclusively with the plug 82 of the heel form.

In order to provide for adjustment of the grippers 114 and the plug 82 lengthwise of the upper 26 relatively to the heel form 68, a screw 118 (FIG. 1) is threaded through a tapped bore in the arm 76 and arranged to engage the key 72, a spring 120 being positioned on the screw between its head and a socket in the arm to restrain the screw against movement from its adjusted position. For actuating the gripper levers 106 and 108 to move the pads 114 into and from gripping engagement with a shoe upper on the heel form assembly the illustrated machine is provided with a piston and cylinder assembly illustrated in FIG. 3 and comprising a piston rod 122 pivotally connected to the bifurcated lower extremity of the gripper lever 106 and a cylinder 124 pivotally connected to the bifurcated lower extremity of the gripper lever 108. The piston rod 122 is slidably mounted in a head 126 at the right end portion of the cylinder 124 and carries at its left end a head 128. The gripper levers 106 and 108 provide the only supporting means for the piston and cylinder assembly and consequently pressurized fluid admitted to the cylinder through a conduit 130 causes movement of the cylinder to the left as seen in FIG. 3 to actuate the gripper lever 108 and movement of the piston to the right to actuate the lever 106. Thus it will be seen that uniform pressure is applied to the pads 114 to grip the upper against the plug 82. Pressure fluid admitted to the cylinder through a conduit 132 moves the piston to the left as seen in FIG. 3 and moves the cylinder to the right thereby to disengage the pads 114 from the upper. In order to insure that both pads are withdrawn to an inoperative position, stop screws 134 are threaded through the gripper levers 106 and 108 and arranged to abut the arms 44 and 46.

For holding the insole 28 in a predetermined position relatively to the upper or heel seat face of the heel form 68 the illustrated machine is provided with a holddown lever 136 (FIG. 1) having two downwardly extending spurs 138 which as shown in FIG. 1 penetrate the insole and hold it against angular movement relatively to the heel form. The holddown lever is fulcrumed in the bifurcated arm 140 of a generally Y-shaped standard 142. The holddown lever is operated by a hand lever 144 having a bifurcated rear end portion which straddles the reduced upper extremity of an arm 146 of the standard and is fulcrumed on a cross-pin 148 mounted in the arm. The handle 144 carries at the extremity of its bifurcated end portion a cross-pin 150 which operates in an elongated rectilinear slot 152 formed in the holddown lever 136. For holding the holddown lever 136 alternatively in its operating position illustrated in FIG. 1 and in its retracted position (not shown) a spring 154 is arranged as shown in FIG. 1 with its lower end portion anchored to the standard 142 and its upper end portion anchored to a pin (not shown) projecting outwardly from the bifurcated portion of the hand lever 144 at a point above and adjacent to the cross-pin 148, the arrangement being such that the spring 154 passes through the axis of the pin 148 during the operation of the hand lever 144. For supporting the standard 142 a generally-circular casting 156 is attached at one end to a forward extension 158 of the block 64 by screws 160 as shown in FIG. 1 and at is opposite end to the main portion of the block by a screw 162 as shown in FIG. 3. The retracted position of the holddown member provides adequate clearance between the holddown member and the heel form for the mounting of a shoe upper and an insole on the heel form preparatory to the operation of the machine and for the removal of an assembled upper and insole from the heel form after the completion of the operating cycle.

Figure 7:
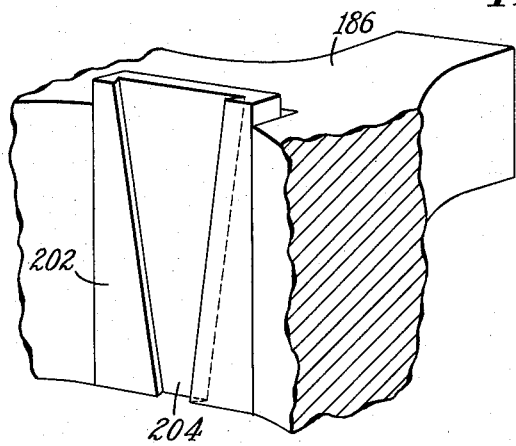
FIG. 7 is a perspective view illustrating the means for mounting the heel pad.

In order to provide for upward movement of the a heel band 164 concomitantly with the upward movement of the heel form and a shoe upper thereon there is attached to the main frame of the machine a vertical plate 166 having a pair of forwardly extending ribs 168 and having in its forward portion a pair of arms 170 (FIG. 2) extending outwardly in opposite directions from the plate. Each rib 168 has formed therein a vertical slot 172. Mounted in the slots are opposite end portions of a cross-pin 174 carried by the bifurcated lower end portion of a bar 176 which straddles the ribs a forked extension 178 of the block 64 positioned between the ribs. A roll 180 mounted on the pin 174 is arranged to be received within the forked extension 178. A vertical channel member 182 is secured to the upper portion of the bar 176 by screws 184 and arranged to support a yoke 186 by means of pins 188 (FIG. 2) mounted in forwardly extending portions of the yoke and adjacent upper portions of the channel member 182. A pair of spring loaded plates 190 carried by the vertical plate 166 in its upper position bear against the yoke 186 and a pin 192 is carried by the yoke and arranged to about the channel member 182 so as to restrict movement of the yoke. The yoke is centrally bored to receive the head of a plunger 194 which is normally urged forwardly by a spring 196 surrounding the stem of the plunger and confined between the head of the plunger and the base of a barrel 198 herein illustrated as an extension of the yoke 186 providing a housing for the plunger and the spring. Forward movement of the plunger by the spring is limited by a nut 200 on a threaded end portion of the stem of the plunger projecting from a bore in the base of the barrel. The head end of the plunger carries a vertical plate 202 (FIG. 7) having formed therein a downwardly tapered dovetail slot 204 which receives a complementary shaped tongue 206 incorporated in a plate 207 fixed to a flexible band 208 to which the rubber heel band 164 is attached. It will be understood that the illustrated heel band is interchangeable with other heel bands of different sizes and styles.

In the operation of the illustrated machine the operator places the heel end portion of a shoe upper upon the heel form 20 which is then in its loading station as shown in FIG. 5. In this position of the form the plug 82 is supported in the heel form 68 with the rear face of the plug in abutting relation to a forward face of the heel form. An insole, as for example the insole 28 illustrated in FIG. 1, is then placed upon the heel seat face of the heel form so that the edge face of the heel end portion of the insole registers accurately with the edge of the heel seat face of the form. While the operator holds the insole in this position with his right hand, he operates the hand lever 144 of the insole holddown mechanism with his left hand thereby to bring the holddown lever 136 into engagement with the insole and to cause the spurs 138 to engage and penetrate the insole as shown in FIG 1 thereby to maintain the orientation of the insole upon the heel form. The spring 154 retains the holddown lever in its operative position shown in FIG. 1 and permits the operator to use both hands to position the heel portion of the upper properly on the form for the wiping and tacking operations. After the operator has so positioned the heel portion of the upper upon the form he applies toward tension to the rear portion of the upper in order to cause the upper to lie smoothly against the opposite sides of the heel form insofar as this objective can be accomplished manually. While the upper is manually held against the form by the operator and while the form remains in its loading position illustrated in FIG. 5 the operator depresses a treadle 210 (FIG. 6) fulcrumed at 212 in the base of the machine thereby to cause angular movement of a bell crank lever 214 in a clockwise direction as seen in FIG. 8. The bell crank lever is fulcrumed at 216 on a pin mounted in the lower portion of a fixed plate 218 to which there is fixed a valve structure 220. The bell crank lever moves the valve stem 222 to the right as seen in FIG. 8 thereby pressurizing the left end portion of the cylinder 124 thus causing the gripper pads 114 to grip the upper against the forward portion 82 of the heel form. A second treadle (not shown) is then depressed slightly to initiate the operation of a hydraulic mechanism (not shown) which operates through a linkage including a slotted link 224 (FIGS. 8 and 9) and an arm 226 to swing the jack assembly from its loading position illustrated in FIG. 4 into its operating position illustrated in FIG. 1, such swinging movement terminating upon the engagement of the insole holddown lever 136 with an abutment member 228. During the swinging movement of the jack from its loading position the slotted extension 178 of the block 64 engages the roll 180 and during the latter part of the swinging movement of the jack the upward component of the swinging movement of the jack assembly causes the bar 176 to move upwardly concomitantly with the form 68 carrying with it the channel member 182 and the yoke 186 which carries the upper engaging pad 164. Thus it will be seen that the upper engaging pad moves vertically concomitantly with the heel form 68 after the upper has been brought into pad engaging position thus preventing any dislocation of the upper heightwise therefrom relatively to the heel form. The pivotal mounting of the yoke 186 on the pin 188 permits the pad to adjust itself angularly to the upper as the upper is brought into contact therewith thus insuring the application of uniform pressure by the pad upon the upper.

During the swinging movement of the jack assembly from its position in FIG. 5 into its position illustrated in FIG. 1, two rolls 230 mounted at the upper extremities of the gripper levers 106 and 108 respectively engage a pair of blocks 232 secured to the arms 170 (FIG. 2) by screws 234. Further movement of the jack assembly together with the heel form 68 after the rolls 230 engage the blocks 232 causes relative movement of the heel form 68 on the one hand and the upper gripping assembly comprising the plug 82 and the upper gripping pads 114 on the other hand thus tensioning the heel portion of the upper toewardly about the block 64.

The second treadle above referred to is then further depressed to cause the operation of a well known mechanism which not shown in the drawings to move the jack further upwardly and rearwardly thereby to bring the upper into position for the operation of the lasting wipers (not shown). Such further rearward movement of the jack augments the stretching action upon the rear portion of the upper, causing it to conform more closely to the contour of the heel form. It will be understood that the degree of stretching action imparted to the upper depends upon the relative positions of the heel form and the plug 82 when the machine is at rest. This relative position is determined by the abutment screw 118 carried by the arm 76. This screw may be adjusted to vary the position of the plug 82 relatively to the heel form 68.

Upon the completion of the second stage of the upward and rearward movement of the heel form the depression of the second treadle is completed to initiate the lasting and tack driving operations. This cycle of operations, which is common to machines of this general type, consists in an initial overwiping movement of the lasting wipers under relatively light pressure followed by retraction of the wipers and a further upward movement of the jack assembly. In the illustrated machine the second upward movement is limited by the abutment member 228. Following the second upward movement of the jack assembly the lasting wipers advance under the relatively heavy pressure thus causing the formation of a well defined feather line crease in the heel end portion of the upper. While the wipers remain advanced lasting tacks are driven through apertures in the wipers to attach the overlasted margin of the upper to the insole.

In overwiping the heel portion of the lasting margin the lasting wipers engage folded or pleated upper materials at the dog ear portions (so-called) which substantially increase the thickness of the overlasted materials thus producing an uneven condition of the overlasted margin about the heel seat portion of the shoe. Under these circumstances a slight angular movement of the heel seat face of the heel form is required to insure uniform pressure of the lasting wipers upon the full extent of the lasting margin about the heel end portions of the shoe. In the illustrated organization this is achieved by mounting the block 64 for rocking action upon the rolls 52 and 54 It will be understood that during such rocking action of the block 64 the registration of the heel band 164 vertically relatively to the upper 26 is maintained unchanged by the action of the forked extension 178 of the block 64 upon the roll 180 carried by the bar 176. It will be remembered that angular movement of the heel band consonant to the angular movement of the heel form is permitted by the pivotal mounting of the yoke 186 upon the pins 188.

Figure 6:
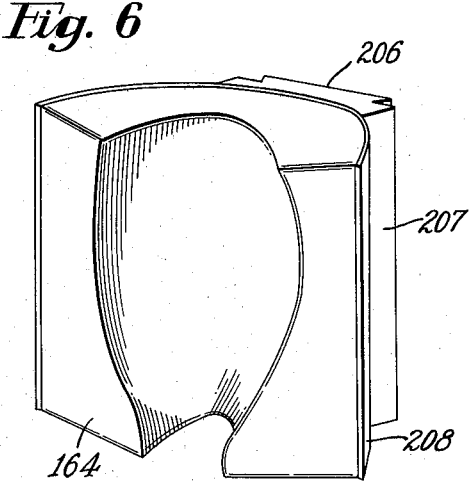
FIG. 6 is a perspective view illustrating an upper engaging heel pad.

Upon the completion of the lasting cycle the second treadle above referred to is again depressed to cause the return of the jack assembly to its loading position illustrated in FIG. 4. The return movement of the jack causes a similar swinging movement of the arm 226, this being a movement to the left as seen in FIG. 8. During such swinging movement of the arm a detent 236 depending from a pin 238 engages a pin 240 at the lower extremity of the bell crank lever 214 thereby swinging the bell crank lever in a counterclockwise direction as seen in FIG. 6 in order to shift the valve 220. Referring to FIG. 3 the shifting of the valve opens the conduit 132 to pressure and opens the conduit 130 to exhaust whereby the gripper levers 106 and 108 are concomitantly operated to disengage the upper gripping pads 114 from the upper 26. During the swinging movement of the arm 226 as above described the detent 236 is held against counterclockwise movement by its engagement with a ledge 242 provided by a land 244 on the head of a pin 246 carried by the arm 226. The retraction of the upper gripping pads 114 into their respective inoperative positions leaves the now assembled upper and insole combination free to be moved from the heel form.

Having thus described our invention, what we claim as new and desire to secure by Letters Patent of the United States is:

1. In a shoe machine, a form for mounting an end portion of a shoe upper and an insole, said form having a base and an insole receiving surface, means mounting the form for movement to present the upper to operating instrumentalities of the machine, a member mounted within the form in a recess between the base of the form and its insole receiving surface, means mounting said member for movement relatively to the form endwise of a shoe upper mounted thereon, and means for gripping the upper against the member.

2. In a shoe machine, a form for mounting an end portion of a shoe upper and having a continuous surface for supporting an insole, means mounting the form for movement to present an upper thereon to operating instrumentalities of the machine, a plug mounted within the form in a recess extending lengthwise thereof between the base of the form and its insole receiving surface said plug having contoured surfaces which are engaged by opposite side portions of a shoe upper on the form said plug being movable relatively to the form endwise of a shoe upper mounted thereon and means for gripping the upper against the plug.

3. In a shoe machine, a form for mounting an end portion of a shoe upper, means mounting the form for movement to present the upper to operating instrumentalities of the machine, a plug mounted within the form for movement relatively thereto endwise of a shoe upper mounted thereon and gripping means carried by the form mounting means and arranged to grip the upper against the plug.

4. In a shoe machine, a form for mounting an end portion of a shoe upper, means mounting the form for movement to present the upper to operating instrumentalities of the machine, a plug mounted in the form for movement relatively thereto endwise of a shoe upper mounted thereon, gripping means carried by the form mounting means and arranged to grip the upper against the plug, and means for causing relative movement of the gripping means and the form endwise of a shoe upper mounted on the form.

5. In a shoe machine, a form for mounting an end portion of a shoe upper, means mounting the form for movement to present the upper to operating instrumentalities of the machine, a plug mounted in the form for movement relatively thereto endwise of a shoe upper mounted thereon, gripping means carried by the form mounting means and arranged to grip the upper against the plug, means for causing relative movement of the gripping means and the form endwise of a shoe upper mounted on the form, and means for causing movement of the plug consonant with the movement of the gripping means relatively to the form.

6. In a shoe machine, a form for mounting an end portion of a shoe upper, means mounting the form for movement to present the upper to operating instrumentalities of the machine, a plug mounted in the form for movement relatively thereto endwise of a shoe upper mounted thereon, gripping means carried by the form mounting means for gripping the upper against the plug, a carrier for the gripping means, means mounting the carrier on the form and connections between the carrier and the plug whereby to cause a constant registration of the plug with the gripping means.

7. In a shoe machine, a form for mounting an end portion of a shoe upper, means mounting the form for movement to present the upper to operating instrumentalities of the machine, a plug mounted in the form for movement relatively thereto lengthwise of a shoe upper mounted thereon, gripper members carried by the form mounting means for gripping the upper against the plug, a carrier for the gripping means and means for mounting the carrier comprising members mounted on the form mounting means for affording movement of the carrier generally heightwise of a shoe upper mounted on the form.

8. In a shoe machine, a form for mounting an end portion of a shoe upper, means mounting the form for movement to present the upper to operating instrumentalities of the machine, a plug mounted in the form for movement relatively thereto lengthwise of a shoe upper mounted thereon, gripper members carried by the form mounting means for gripping the upper against the plug, a carrier for the gripping means, means for mounting the carrier comprising members mounted on the form mounting means for affording movement of the carrier generally heightwise of a shoe upper mounted on the form, and means for biasing said members toward the plug.

9. In a shoe machine, a form for mounting an end portion of a shoe upper, a plug mounted in the form for movement relatively thereto endwise of a shoe upper mounted thereon, a pair of gripper members for gripping opposite side portions of a shoe upper on the form against said plug, and means carried by the gripper members for effecting the operation thereof.

10. In a shoe machine, a form for mounting an end portion of a shoe upper, a plug mounted in the form for movement relatively thereto endwise of a shoe upper mounted thereon, a pair of members for gripping opposite side portions of a shoe upper on the form against said plug, means carried by the gripper members for effecting the operation thereof, and means for determining retracted positions of the gripper members respectively.

11. In a shoe machine, a shoe form for mounting an end portion of a shoe upper, a carrier for mounting the form for movement to present the upper to operating instrumentalities of the machine, a plug mounted in the form for movement relatively thereto endwise of a shoe upper mounted thereon, a pair of members for gripping opposite side portions of the upper against the plug, a pair of levers in which the gripper members are respectively mounted, means whereby the levers are fulcrumed respectively on the carrier and means carried by the levers and arranged to operate the gripper members.

12. In a shoe machine, a form for mounting an end portion of a shoe upper, an upper embracing member for bringing the upper into intimate engagement with the form, a first carrier for the form means mounting the carrier for angular movement on an axis extending widthwise of a shoe upper mounted on the form, a second carrier for the upper embracing means and connections between the first carrier and the second carrier whereby the registration of the upper embracing means with a shoe upper on the form is maintained unchanged during the angular movement of the first carrier.

13. In a shoe machine, a form for mounting an end portion of a shoe upper, means on which the form is removably mounted, a pin extending upwardly from the mounting means and receivable within an opening in the form, a member carried by the mounting means and arranged to determine the orientation of the form on the mounting means and means carried by the mounting means and arranged to hold the form against separation from the mounting means.

14. In a shoe machine, a form for mounting an end portion of a shoe upper, a plug mounted in the form for movement relatively thereto endwise of a shoe upper mounted thereon, means on which the form is removably mounted, a pin extending upwardly from the form mounting means and receivable in an opening in the form, means carried by the mounting means and arranged to determine the orientation of the form on the mounting means, a retaining means carried by the mounting means and arranged to hold the form against separation from the mounting means and means whereby the retaining means determines the position of the plug relatively to the shoe form endwise of a shoe upper mounted thereon.

15. In a shoe machine, a form for mounting an end portion of a shoe upper, a plug mounted in the form for movement relatively thereto endwise of a shoe upper mounted thereon, means on which the form is removably mounted, a pin extending upwardly from the form mounting means and receivable in an opening in the form, means carried by the mounting means and arranged to determine the orientation of the form on the mounting means, a retaining means carried by the mounting means and arranged to hold the form against separation from the mounting means, means whereby the retaining means determines the position of the plug relatively to the shoe form endwise of a shoe upper mounted thereon, and means for adjustably determining the rest position of the plug relatively to the form in a direction endwise of a shoe upper on the form.

16. In a shoe machine, a form for mounting an end portion of a shoe upper, a plug mounted in the form for movement relatively thereto endwise of a shoe upper mounted thereon, and a pair of members for gripping opposite side portions of a shoe upper on the form against said plug.

17. In a shoe machine, a form for mounting an end portion of a shoe upper, a first carrier for the form, means mounting the first carrier for angular movement on an axis extending widthwise of a shoe upper mounted on the form, a second carrier for mounting alternatively any one of a plurality of upper embracing members arranged to bring a shoe upper into intimate engagement with the form and connections between the first carrier and the second carrier whereby the registration of an upper embracing member on the second carrier with a shoe upper on the form is maintained unchanged during the angular movement of the first carrier.

18. In a shoe machine, a form for mounting an end portion of a shoe upper and an insole, means mounting the form for movement to present the upper to operating instrumentalities of the machine, upper gripping means comprising a member mounted within the form and grippers for gripping the upper against said member, said member being mounted in a recess between the base of the form and its insole receiving surface and being movable relatively to the form endwise of a shoe upper mounted thereon, and abutment means for arresting the gripping means during movement of the form to present a shoe upper thereon to operating instrumentalities of the machine thereby to cause relative movement of the form and the gripping means lengthwise of the upper such that tension is applied to portions of the upper between the gripping means and that extremity of the upper mounted on the form.

References Cited by the Examiner

UNITED STATES PATENTS

| | | | |
|---|---|---|---|
| 1,010,800 | 12/1911 | Pym | 12—14.2 |
| 2,325,047 | 7/1943 | Duplessis | 12—14.2 X |
| 2,983,934 | 5/1961 | Bertrand | 12—54.3 |
| 2,983,935 | 5/1961 | Carr | 12—54.3 |
| 3,038,182 | 6/1962 | Woodman | 12—1 |
| 3,132,362 | 5/1964 | Stapleton | 12—54.3 |

FOREIGN PATENTS 29,703    1910    Great Britain.

JORDAN FRANKLIN, *Primary Examiner.*